(12) United States Patent
Onoue et al.

(10) Patent No.: US 10,650,972 B2
(45) Date of Patent: May 12, 2020

(54) ELECTRONIC COMPONENT

(71) Applicant: TDK CORPORATION, Tokyo (JP)

(72) Inventors: Toru Onoue, Tokyo (JP); Fumiaki Satoh, Tokyo (JP); Takuto Okamoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/116,333

(22) Filed: Aug. 29, 2018

(65) Prior Publication Data

US 2019/0066926 A1 Feb. 28, 2019

(30) Foreign Application Priority Data

Aug. 31, 2017 (JP) .................................. 2017-166935

(51) Int. Cl.
| | |
|---|---|
| *H01G 4/30* | (2006.01) |
| *H01G 4/232* | (2006.01) |
| *H01G 4/248* | (2006.01) |
| *H01G 4/005* | (2006.01) |
| *H01G 4/12* | (2006.01) |
| *H01G 4/008* | (2006.01) |
| *H01G 2/06* | (2006.01) |

(52) U.S. Cl.
CPC ............ *H01G 4/248* (2013.01); *H01G 4/005* (2013.01); *H01G 4/12* (2013.01); *H01G 4/232* (2013.01); *H01G 4/30* (2013.01); *H01G 2/065* (2013.01); *H01G 4/008* (2013.01); *H01G 4/1227* (2013.01)

(58) Field of Classification Search
CPC .......... H01G 4/30; H01G 4/232; H01G 4/005; H01G 4/008; H01G 4/248
USPC ......... 361/321.2, 321.3, 301.4, 306.1, 306.3, 361/309
See application file for complete search history.

(56) References Cited

FOREIGN PATENT DOCUMENTS

| JP | H09-148174 A | 6/1997 |
| JP | 2013012561 A | * 1/2013 |

\* cited by examiner

*Primary Examiner* — Arun Ramaswamy
(74) *Attorney, Agent, or Firm* — Oliff PLC

(57) ABSTRACT

An element body of a rectangular parallelepiped shape has a length in a width direction larger than a length in a height direction and has a length in a longitudinal direction larger than the length in the width direction. A terminal electrode is disposed at an end of the element body in the width direction and extends in the longitudinal direction. The element body includes a pair of principle surfaces opposing each other in the height direction, a pair of end surfaces opposing each other in the longitudinal direction, and a pair of side surfaces opposing each other in the width direction. The terminal electrode includes a conductor disposed on the side surface. The conductor includes a depression having a length in the longitudinal direction larger than a length in the height direction.

5 Claims, 6 Drawing Sheets

ELECTRONIC COMPONENT

BACKGROUND OF THE INVENTION

1. Field of the Invention

The present invention relates to an electric component.

2. Description of Related Art

Known electronic components include an element body of a rectangular parallelepiped shape and a pair of external electrodes (see, for example, Japanese Unexamined Patent Publication No.H9-148174). The element body has a length in a width direction larger than a length in a height direction and has a length in a longitudinal direction larger than the length in the width direction. The pair of external electrodes is disposed at both ends of the element body in the width direction and extends in the longitudinal direction. The element body includes a pair of principle surfaces opposing each other in the height direction, a pair of end surfaces opposing each other in the longitudinal direction, and a pair of side surfaces opposing each other in the width direction. Each of the external electrodes includes a conductor located on the side surface.

SUMMARY OF THE INVENTION

The electronic component is mounted in a state in which the principle surface opposes an electronic device. Examples of the electronic device include a circuit board and an electronic component. The electronic device includes a pair of lands corresponding to the pair of terminal electrodes. Each of the terminal electrodes is electrically and physically connected to a corresponding land via solder. A length of the element body in the longitudinal direction is longer than a length in the width direction. The terminal electrodes extend in the longitudinal direction of the element body. In a case in which the electronic component is mounted on the electronic device, the electronic device needs to lands having a large area, as compared with in a case in which an electronic component in which the terminal electrodes extend in the width direction of the element body is mounted on the electronic device. The lands having a large area require a larger amount of solder to connect the terminal electrodes and the lands. A large amount of solder often leads to wetting of the solder over the conductor. Wetting of the solder may cause tombstoning. Tombstoning is a phenomenon in which electronic components rise during solder-mounting.

An object of one aspect of the present invention is to provide an electronic component that suppresses wetting of solder.

An electronic component according to one aspect includes an element body of a rectangular parallelepiped shape and a pair of terminal electrodes. The element body has a length in a width direction larger than a length in a height direction and has a length in a longitudinal direction larger than the length in the width direction. The pair of terminal electrodes is disposed at both ends of the element body in the width direction and extends in the longitudinal direction. The element body includes a pair of principle surfaces opposing each other in the height direction, a pair of end surfaces opposing each other in the longitudinal direction, and a pair of side surfaces opposing each other in the width direction. Each of the terminal electrodes includes a conductor disposed on the side surface. The conductor includes a depression having a length in the longitudinal direction larger than a length in the height direction.

In the one aspect, the depression is formed in the conductor. At least two protrusions are formed in the conductor in such a manner that the depression is positioned between the protrusions in the height direction. When solder wets over the conductor, the solder needs to pass over the protrusion before reaching the depression. In the one aspect, the distance at which the solder wets over the conductor is long, as compared with an electronic component in which no depression is formed in the conductor. Therefore, the solder tends not to wet over the conductor. Even in a case in which the solder passes over the protrusion, the solder tends to accumulate in the depression, and a solder pool is formed in the depression. Therefore, the solder tends not to wet beyond the depression. Consequently, the one aspect suppresses wetting of the solder.

In the one aspect, the depression may be formed at an approximate center of the conductor when viewed from the width direction.

In a configuration in which the solder pool is formed at the approximate center of the conductor when viewed from the width direction, the solder tends not to wet beyond the approximate center of the conductor, but tends to wet over a region deviated from the approximate center of the conductor. Therefore, this configuration ensures a bonding strength by soldering between the terminal electrode and the electronic device. Consequently, this configuration suppresses wetting of the solder, and ensures the bonding strength by soldering.

In the one aspect, the conductor may include a first end region, a second end region, and a center region. In this case, the first end region is located closer to one end surface of the pair of end surfaces in the longitudinal direction. The second end region is located closer to another end surface of the pair of end surfaces in the longitudinal direction. The center region is located between the first end region and the second end region in the longitudinal direction. In a cross-section of the conductor taken along a plane that is parallel to the principle surface and is located closer to the principle surface than the depression in the height direction, a thickness of the center region may be greater than a thickness of each of the first and second end regions.

In a configuration in which the thickness of the center region is larger than the thickness of each of the first and second end regions in the above-mentioned cross-section, the solder tends not to reach the depression. Therefore, this configuration suppresses wetting of the solder in the center region. Since the thickness of each of the first and second end regions is smaller than the thickness of the center region in the above-mentioned cross-section, the solder tend to wet in the first and second end regions. Therefore, this configuration ensures a bonding strength by soldering between the first and second end regions and the electronic device. Consequently, the present configuration suppresses wetting of the solder in the center region and ensures the bonding strength by soldering at the first and second end regions.

In the one aspect, a ratio of the length in the longitudinal direction of the depression to a length of the conductor in the longitudinal direction may be from 0.2 to 0.4.

In a configuration in which the ratio is greater than or equal to 0.2, a length in the longitudinal direction of the region where the depression is formed in the conductor does not become excessively small. Therefore, this configuration more reliably suppresses wetting of the solder. In a configuration in which the ratio is less than or equal to 0.4, the length of the region where the depression is formed in the conductor in the longitudinal direction does not become excessively large. Therefore, this configuration reliably achieves wetting of the solder and further ensures the bonding strength by soldering.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
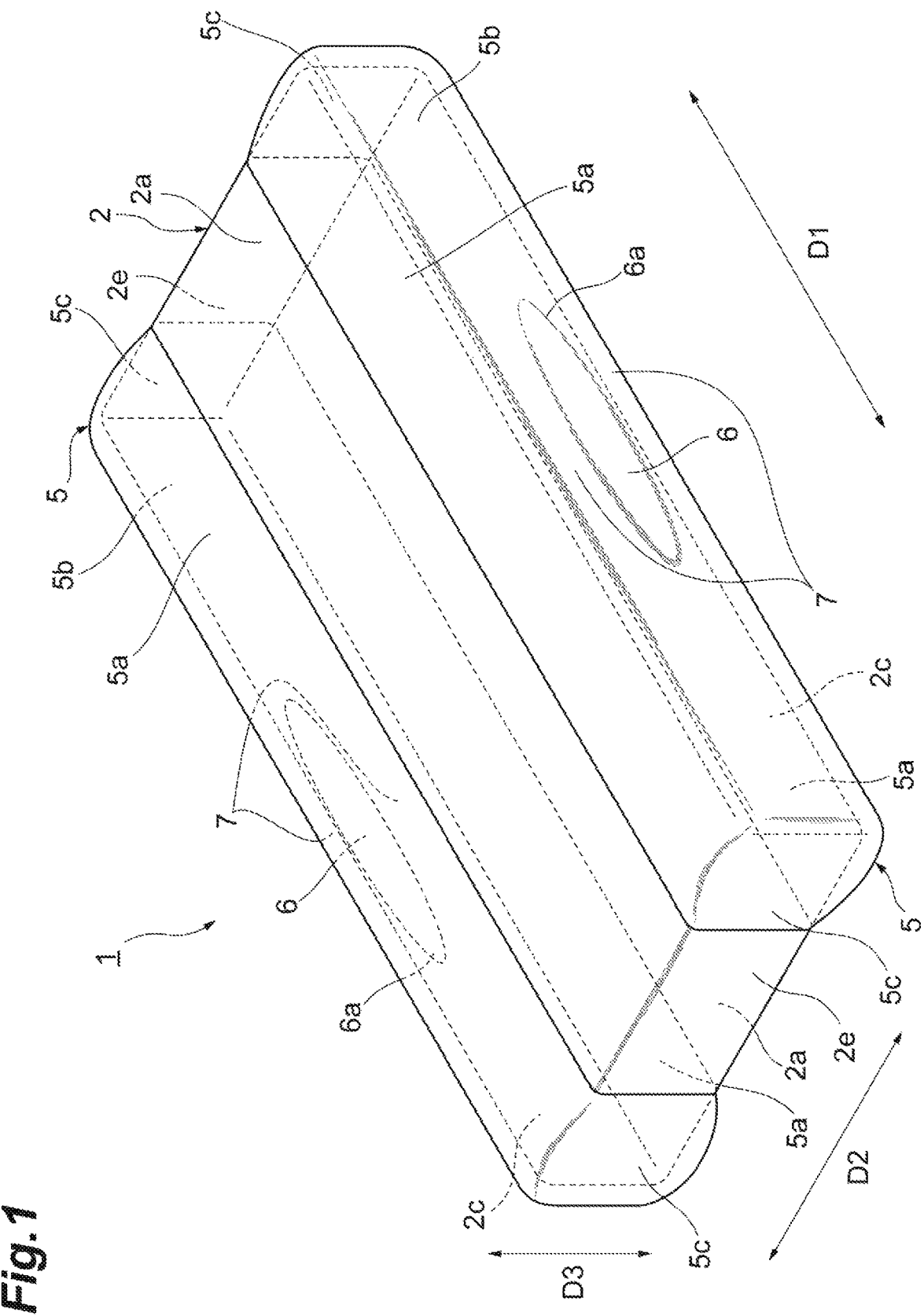
FIG. 1 is a perspective view of a multilayer capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
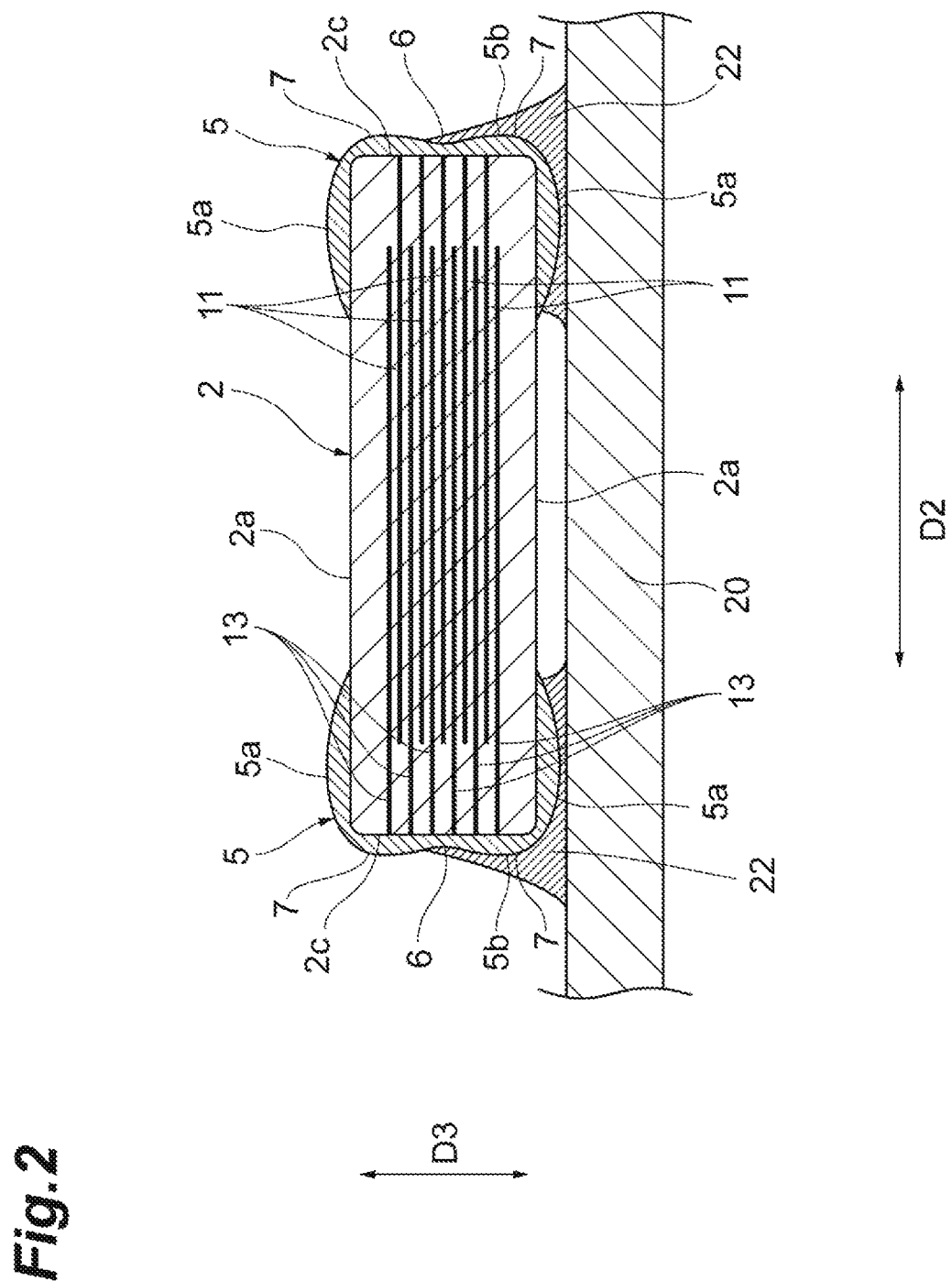
FIG. 2 is a view illustrating a cross-sectional configuration of the multilayer capacitor according to the embodiment.

A configuration of a multilayered capacitor 1 according to an embodiment will be described with reference to FIGS. 1 and 2. FIG. 1 is a perspective view of a multilayered capacitor of the embodiment. FIG. 2 is a view illustrating a cross-sectional configuration of the multilayer capacitor according to the embodiment. In the present embodiment, an electronic component is, for example, a multilayered capacitor 1.

As illustrated in FIGS. 1 and 2, the multilayered capacitor 1 includes an element body 2, a pair of terminal electrodes 5 disposed on an outer surface of the element body 2, and a plurality of internal electrodes 11 and 13 disposed inside the element body 2. The multilayered capacitor 1 is mounted on an electronic device 20 by soldering, as illustrated in FIG. 2. The electronic device 20 includes a circuit board or an electronic component, for example. The electronic device 20 includes a pair of pad electrodes (lands). The pad electrodes are not illustrated in FIG. 2. In a state in which the multilayered capacitor 1 is solder-mounted on the electronic device 20, a solder fillet 22 is formed between the terminal electrode 5 and the pad electrode that correspond to each other.

The element body 2 has a rectangular parallelepiped shape. The rectangular parallelepiped shape includes a rectangular parallelepiped shape in which corners and ridges are chamfered, and a rectangular parallelepiped shape in which the corners and ridges are rounded. The element body 2 has a length in a width direction D2 larger than a length in a height direction D3. The element body 2 has a length in a longitudinal direction D1 larger than the length in the width direction D2.

The element body 2 includes a pair of principle surfaces 2a, a pair of side surfaces 2c, and a pair of end surfaces 2e. The pair of principle surfaces 2a opposes each other in the height direction D3. The pair of side surfaces 2c opposes each other in the width direction D2. The pair of end surfaces 2e opposes each other in the longitudinal direction D1. In the multilayered capacitor 1, one principle surface 2a opposes the electronic device 20. The one principle surface 2a is arranged to constitute a mounting surface. The one principle surface 2a is the mounting surface. FIG. 2 is a cross-sectional view of the multilayered capacitor 1 taken along a plane that is parallel to the pair of end surfaces 2e and is located at approximately an equal distance from the pair of end surfaces 2e.

The element body 2 is configured by laminating a plurality of dielectric layers in the height direction D3 in which the pair of principle surfaces 2a opposes each other. The element body 2 includes the plurality of laminated dielectric layers. In the element body 2, a lamination direction of the plurality of dielectric layers coincides with the height direction D3. For example, each of the dielectric layers includes a sintered body of a ceramic green sheet containing a dielectric material. Examples of the dielectric material include dielectric ceramics, such as $BaTiO_3$-, $Ba(Ti, Zr)O_3$-, or $(Ba, Ca)TiO_3$-based dielectric ceramics. In the actual element body 2, the dielectric layers are integrated to such an extent that boundaries between the dielectric layers cannot be visually recognized.

As illustrated in FIG. 1, the pair of terminal electrodes 5 is disposed at both ends of the element body 2 in the width direction D2. Each of the terminal electrodes 5 extends in the longitudinal direction D1. In the multilayered capacitor 1, the terminal electrodes 5 are provided along the side surfaces 2c of the element body 2. Providing the terminal electrodes 5 along the side surfaces 2c of the element body 2 makes the current path be short in the multilayered capacitor 1. Therefore, the multilayered capacitor 1 has a low equivalent series inductance (ESL).

The pair of terminal electrodes 5 is separated from each other and opposes each other in the width direction D2. Each of the terminal electrodes 5 includes a pair of conductors 5a, a conductor 5b, and a pair of conductors 5c. Each of the conductors 5a is disposed on the corresponding principle surface 2a. The conductor 5b is disposed on the side surface 2c. Each of the conductors 5c is disposed on the corresponding end surface 2e. The conductors 5a, 5b, and 5c are coupled to each other.

The internal electrodes 11 and 13 are disposed at different positions (layers) in the height direction D3 of the element body 2. The internal electrodes 11 and 13 are alternately disposed in the element body 2 to oppose each other in the height direction D3 with an interval therebetween. Polarities of the internal electrodes 11 and the internal electrodes 13 are different from each other.

Each of the internal electrodes 11 is exposed on one side surface 2c of the pair of side surfaces 2c, but not exposed on the pair of principle surfaces 2a and the pair of end surfaces 2e. Each of the internal electrodes 11 includes an end exposed at the one side surface 2c. Each of the internal electrodes 11 is electrically and physically connected to one terminal electrode 5 at the one side surface 2c. Each of the internal electrodes 11 is directly connected to the one terminal electrode 5.

Each of the internal electrodes 13 is exposed on another side surface 2c of the pair of side surfaces 2c, but not exposed on the pair of principle surfaces 2a and the pair of end surfaces 2e. Each of the internal electrodes 13 includes an end exposed at the other side surface 2c. Each of the internal electrodes 13 is electrically and physically connected to another terminal electrode 5 at the other side surface 2c. Each of the internal electrodes 13 is directly connected to the other terminal electrode 5.

The internal electrodes 11 and 13 both have a rectangular shape. The longitudinal direction D1 is a long side direction of each of the internal electrodes 11, 13. The width direction D2 is a short side direction of each of the internal electrodes 11, 13. Each of the internal electrodes 11, 13 includes a main electrode portion and a connecting portion. The main electrode portion has a rectangular shape. The longitudinal direction D1 is a long side direction of the main electrode portion. The width direction D2 is a short side direction of the main electrode portion. The connecting portion includes one end coupled to a long side of the main electrode portion and another end exposed at the side surface 2c. The main electrode portion and the connecting portion are integrally formed.

The internal electrodes 11 and 13 are made of a conductive material that is commonly used as an internal electrode of the multilayer electronic component. The conductive material includes, for example, base metal. The conductive material includes, for example, Ni or Cu. The internal electrodes 11 and 13 include a sintered body of conductive paste containing the conductive material described above.

Figure 3:
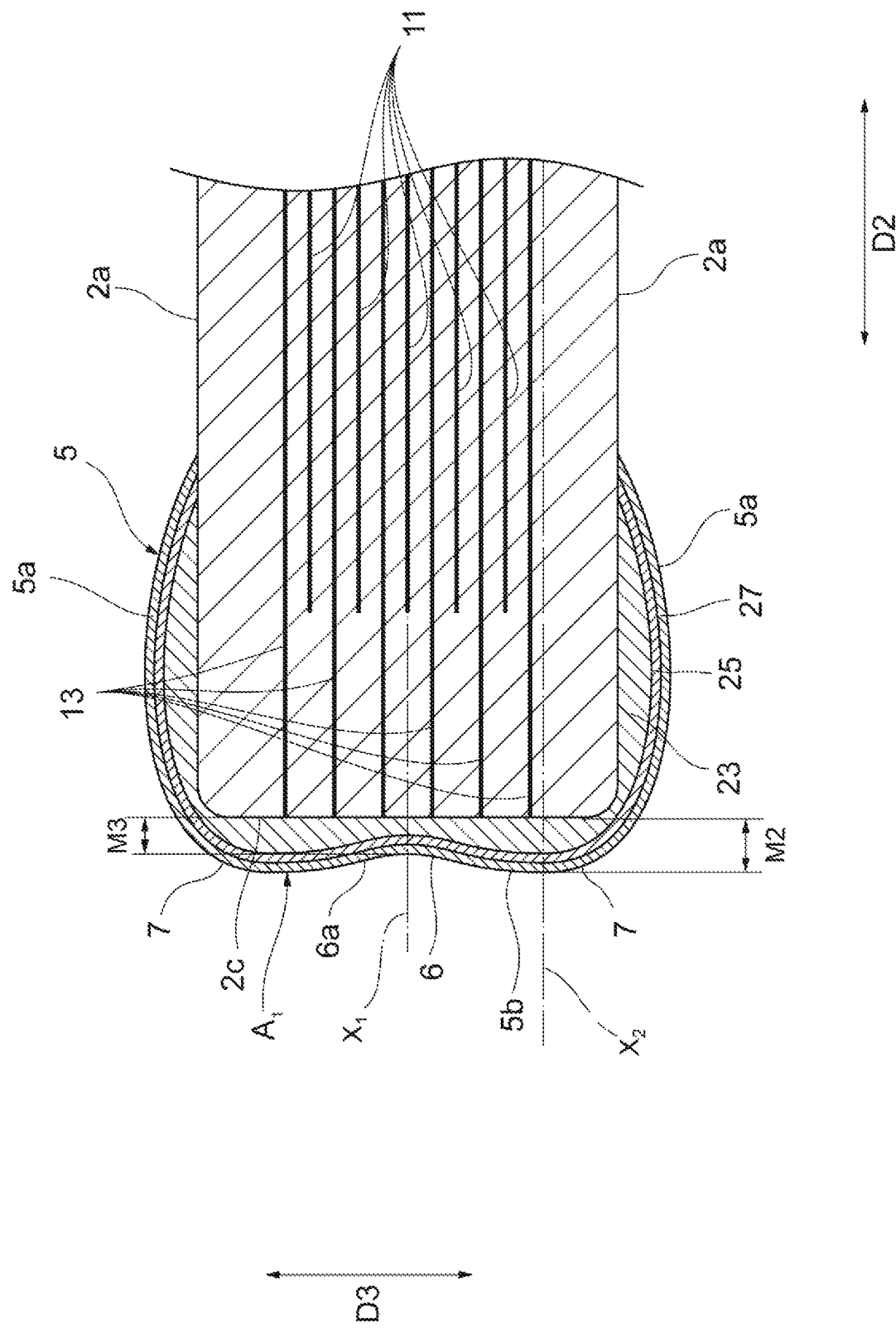
FIG. 3 is a view illustrating a cross-sectional configuration of the multilayer capacitor according to the embodiment.
Figure 4:
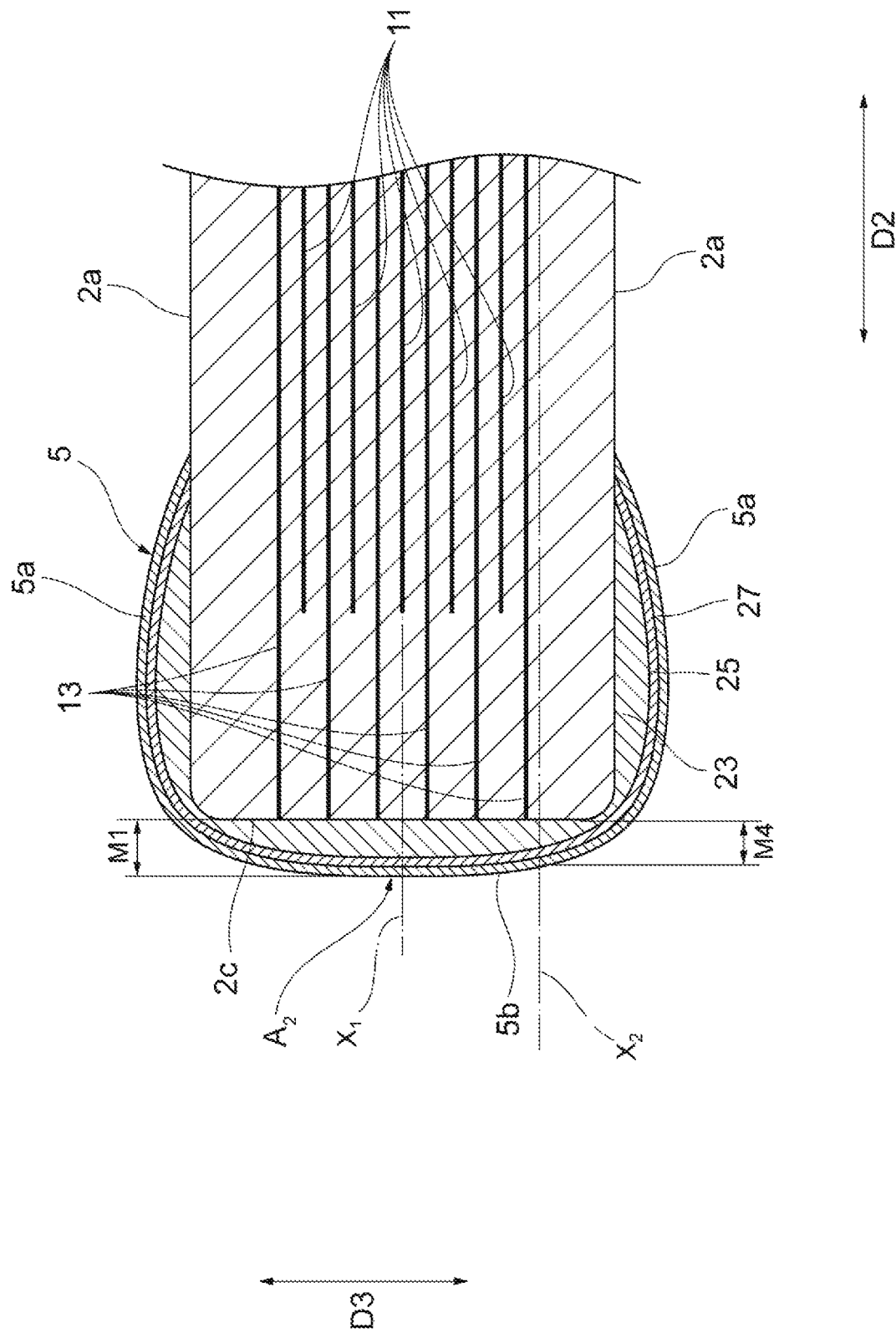
FIG. 4 is a view illustrating a cross-sectional configuration of the multilayer capacitor according to the embodiment.
Figure 5:
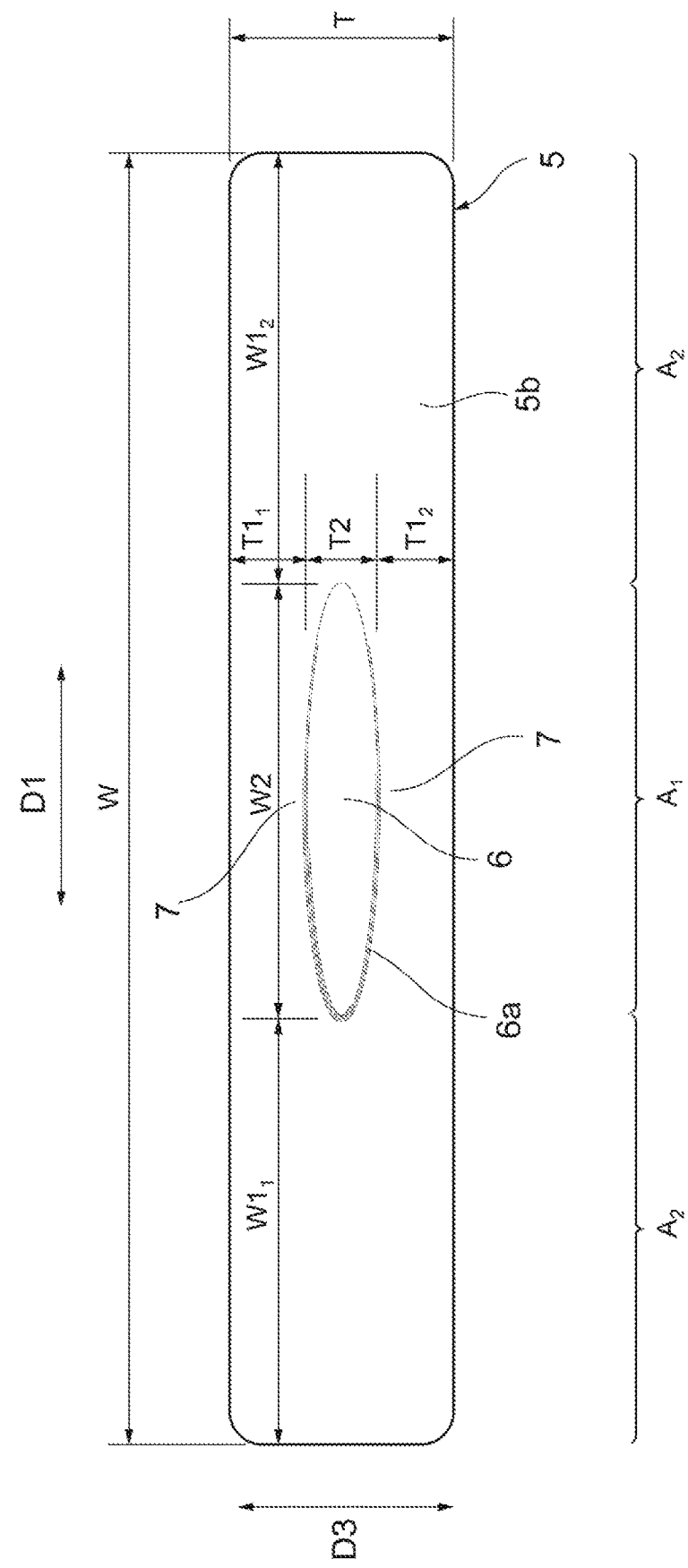
FIG. 5 is a side view of the multilayer capacitor according to the embodiment.

Next, a configuration of the terminal electrodes 5 will be described with reference to FIGS. 3 to 5. FIGS. 3 and 4 are views illustrating a cross-sectional configuration of the multilayered capacitor according to the embodiment. FIG. 5 is a side view of the multilayered capacitor according to the embodiment. FIG. 3 is a cross-sectional view of the multilayered capacitor 1 taken along a plane that is parallel to the pair of end surfaces 2e and is located at approximately an equal distance from the pair of end surfaces 2e. FIG. 4 is a cross-sectional view of the multilayered capacitor 1 taken along a plane that is parallel to the pair of end surfaces 2e and is located closer to the end surface 2e than the depression 6 that is described later.

As illustrated in FIGS. 3 and 4, each of the terminal electrodes 5 includes an electrode layer 23, a first plating layer 25, and a second plating layer 27. The first plating layer 25 is formed on the electrode layer 23 by a plating method. The second plating layer 27 is formed on the first plating layer 25 by a plating method. The plating method includes, for example, an electroplating method. Each of the conductors 5a, 5b, and 5c includes the electrode layer 23, the first plating layer 25, and the second plating layer 27. The electrode layer 23 is an underlayer for forming a plating layer.

The electrode layer 23 is formed by sintering conductive paste applied onto the surface of the element body 2. The electrode layer 23 is formed by sintering a metal component (metal powder) included in the conductive paste. The electrode layer 23 is a sintered metal layer. In the present embodiment, the electrode layer 23 is a sintered metal layer made of Cu. The electrode layer 23 may be a sintered metal layer made of Ni. The conductive paste includes powder made of Cu or Ni, a glass component, an organic binder, and an organic solvent.

In the present embodiment, the first plating layer 25 is a Ni plating layer formed by Ni plating. The first plating layer 25 may be an Sn plating layer, a Cu plating layer, or an Au plating layer. The second plating layer 27 is an Sn plating layer formed by Sn plating. The second plating layer 27 may be a Cu plating layer or an Au plating layer.

Each of the conductors 5b covers an entirety of the corresponding side surface 2c. The entirety of the side surface 2c represents an entire region surrounded by end edges of the pair of principle surfaces 2a and end edges of the pair of end surfaces 2e. As illustrated in FIG. 1, each of the conductors 5a covers a part of the principle surface 2a. The conductor 5a entirety covers a region of the principle surface 2a to a predetermined distance in the width direction D2 from the side surface 2c. As illustrated in FIG. 1, the conductor 5c covers a part of the end surface 2e. The conductor 5c entirety covers a region of the end surface 2e to a predetermined distance in the width direction D2 from the side surface 2c.

As illustrated also in FIG. 1, each of the conductors 5b includes a depression 6. The depression 6 is formed in the conductor 5b. A thickness of the conductor 5b in the width direction D2 gradually increases from the end of the conductor 5b toward an approximate center of the conductor 5b and then gradually decreases. The conductor 5b is coupled to the conductors 5a and 5c at the end of the conductor 5b. The conductor 5b has the smallest thickness in the width direction D2 near the center of the conductor 5b. At the depression 6, the surface of the conductor 5b is recessed in a direction that the surface of the conductor 5b approaches the element body 2 (side surface 2c).

The depression 6 is a region where the surface of the conductor 5b is recessed toward the approximate center of the conductor 5b from the position of the conductor 5b whose thickness is largest. The position of the conductor 5b whose thickness is largest is regarded as an outer edge 6a of the depression 6. The outer edge 6a is also a position where an imaginary plane parallel to the side surface 2c is in contact with the surface of the conductor 5b. At least two protrusions 7 are formed on the conductor 5b in such a manner that the depression 6 is positioned between the protrusions 7 in the height direction D3. In the present embodiment, the pair of protrusions 7 is formed on the conductor 5b. The conductor 5b includes the depression 6 and at least two protrusions 7.

As illustrated in FIG. 5, the depression 6 is formed at the approximate center of the conductor 5b when viewed from the width direction D2. The approximate center of the conductor 5b represents, for example, that when viewed from the width direction D2, a distance $T1_1$ from one end of the external electrode 5 in the height direction D3 to the outer edge 6a and a distance $T1_2$ from another end of the external electrode 5 in the height direction D3 to the outer edge 6a are equivalent, and a distance $W1_1$ from one end of the external electrode 5 in the longitudinal direction D1 to the outer edge 6a a distance $W1_2$ from another end of the external electrode 5 in the longitudinal direction D1 to the outer edge 6a are equivalent. "Equivalent" does not necessarily only mean that values are consistent. Even if values include a slight difference in a predetermined range, manufacturing error, or measurement error, the values may be defined to be equal. For example, if the difference between the lengths $W1_1$ and $W1_2$ is not more than 5% of the length $W1_1$, the lengths $W1_1$ and $W1_2$ can be regarded as being equivalent. For example, if the difference between the lengths $T1_1$ and $T1_2$ is not more than 5% of the length $T1_1$, the lengths $T1_1$ and $T1_2$ can be regarded as being equivalent.

Each length $W1_1$, $W1_2$ is also the shortest length in the longitudinal direction D1 from the end surface 2e to the depression 6. Each length $T1_1$, $T1_2$ is also the shortest length in the height direction D3 from the principle surface 2a to the depression 6.

The depression 6 has a length W2 in the longitudinal direction D1 larger than a length T2 in the height direction D3. In the present embodiment, the outer edge 6a of the depression 6 is in an elliptical shape in which the longitudinal direction D1 is the long axis direction. The elliptical shape also includes an oval shape. The length W2 of the depression 6 is the maximum length in the longitudinal direction D1 of the depression 6. The length T2 of the depression 6 is the maximum length in the height direction D3 of the depression 6.

Figure 6:
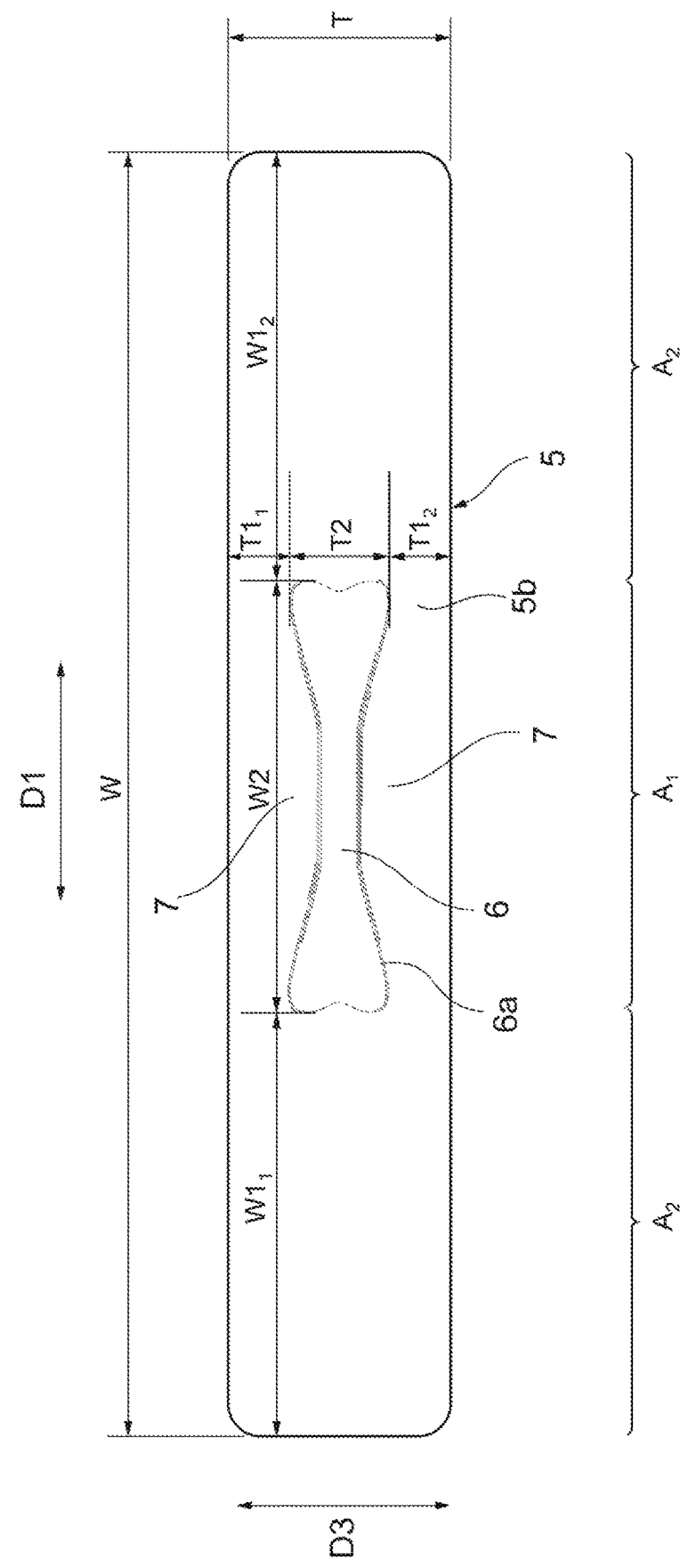
FIG. 6 is a side view of the multilayer capacitor according to a modification of the embodiment.

The outer edge 6a of the depression 6 may have a shape as illustrated in FIG. 6. In the shape illustrated in FIG. 6, the ends of the elliptical outer edge 6a extend toward the four corners of the conductor 5b (four corners of side surface 2c). FIG. 6 is a side view illustrating a multilayered capacitor of a modification of the embodiment. In the modification, the length W2 of the depression 6 is also the largest length of the depression 6 in the longitudinal direction D1, and the length T2 of the depression 6 is the largest length of the depression 6 in the height direction D3. Each length $W1_1$, $W1_2$ is the shortest length between the end surface 2e and the depression 6, and the length $T1_1$, $T1_2$ is the shortest length between the principle surface 2a and the depression 6.

As illustrated in FIG. 5, the conductor 5b includes a pair of end regions $A_2$ and a center region $A_1$. Each of the end regions $A_2$ is located closer to the corresponding end surface 2e of the pair of end surfaces 2e, in the longitudinal direction D1. The center region $A_1$ is located between the pair of end regions $A_2$ in the longitudinal direction D1. The depression 6 is formed in the center region $A_1$. The center region $A_1$ includes the depression 6. The end regions $A_2$ are located closer to the end surfaces 2e than the depression 6 in the longitudinal direction D1. For example, when one end region $A_2$ constitutes a first end region, the other end region $A_2$ constitutes a second end region.

FIG. 3 illustrates the cross-section of the center region $A_1$. FIG. 4 illustrates a cross-section at the end region $A_2$. As illustrated in FIGS. 3 and 4, in the cross-section (e.g., cross-section along line $X_1$) of the conductor 5b taken along a plane that is parallel to the principle surfaces 2a and is located at approximately an equal distance from the principle surfaces 2a in the height direction D3, a thickness M1 of the end region $A_2$ is larger than a thickness M3 of the center region $A_1$. In the cross-section (e.g., cross-section along line $X_2$) of the conductor 5b taken along a plane that is parallel to the principle surface 2a and is located closer to the principle surface 2a than to the depression 6 in the height direction D3, a thickness M2 of the center region $A_1$ is larger than a thickness M4 of the end region $A_2$.

The thickness M1 is, for example, a thickness at an arbitrary position of the end region $A_2$ in the cross-section along the line $X_1$. The thickness M2 is, for example, a thickness at an arbitrary position in the center region $A_1$ in the cross section along the line $X_2$. The thickness M3 is, for example, a thickness at an arbitrary position in the center region $A_1$ in the cross-section along the line $X_1$. The thickness M4 is, for example, a thickness at an arbitrary position of the end region $A_2$ in the cross-section along the line $X_2$.

The thicknesses M1 to M4 may be average thicknesses obtained as follows. The thickness M1 is obtained, for example, by dividing the area of the end region $A_2$ in the cross-section along the line $X_1$ by the length of the end region $A_2$ in the longitudinal direction D1 in the cross-section along the line $X_1$. The thickness M2 is obtained, for example, by dividing the area of the center region $A_1$ in the cross-section along the line $X_2$ by the length of the center region $A_1$ in the longitudinal direction D1 in the cross-section along the line $X_2$. The thickness M3 is obtained, for example, by dividing the area of the center region $A_1$ in the cross-section along the line $X_1$ of the center region $A_1$ by the length in the longitudinal direction D1 in the cross-section along the line $X_1$. The thickness M4 is obtained, for example, by dividing the area of the end region $A_2$ in the cross-section along the line $X_2$ by the length of the end region $A_2$ in the longitudinal direction D1 in the cross-section along the line $X_2$.

A ratio [W2/W] of the length W2 of the depression 6 in the longitudinal direction D1 to a length W of the conductor 5b in the longitudinal direction D1 is, for example, from 0.2 to 0.4. A ratio [T2/T] of the length T2 of the depression 6 in the height direction D3 to a length T of the conductor 5b in the height direction D3 is, for example, from 0.2 to 0.3.

As described above, in the present embodiment, the depression 6 is formed in the conductor 5b, and at least two protrusions 7 are formed in the conductor 5b in such a manner that the depression 6 is located between the protrusions 7 in the height direction D3. When the solder wets over the conductor 5b, the solder needs to pass over the protrusion 7 before reaching the depression 6. In the multilayered capacitor 1, the distance at which the solder wets over the conductor 5b is long, as compared with a configuration in which the depression 6 is not formed in the conductor 5b. Therefore, the solder tends not to wet over the conductor 5b. Even in a case in which the solder passes over the protrusions 7, the solder tends to accumulate in the depression 6, and a solder pool is formed in the depression 6. Therefore, the solder tends not to wet beyond the depression 6. Consequently, the multilayered capacitor 1 suppresses wetting of the solder. Suppressing the wetting of the solder prevents tombstoning of the multilayered capacitor 1. Since the distance at which the solder wets over the conductor 5b is long, the solder tends not to reach the principle surface 2a of the element body 2. Therefore, the multilayered capacitor 1 reliably achieves a low profile after solder-mounting.

In the multilayered capacitor 1, when viewed from the width direction D2, the depression 6 is formed at the approximate center of the conductor 5b. Since the solder pool is formed at the approximate center of the conductor 5b, the solder tends not to wet beyond the approximate center of the conductor 5b, but the solder tends to wet over a region deviated from the approximate center of the conductor 5b. Therefore, the multilayered capacitor 1 ensures a bonding strength by soldering between the terminal electrode 5 and the electronic device 20. Consequently, the multilayered capacitor 1 suppresses wetting of the solder, and ensures the bonding strength by soldering.

In the multilayered capacitor 1, the thickness of the center region $A_1$ is larger than the thickness of the end region $A_2$ in the cross section along the line $X_2$, so that the solder tends not to reach the depression 6. Therefore, the multilayered capacitor 1 suppresses wetting of the solder in the center region $A_1$. In the cross-section along the line $X_2$, the thickness of each of the end regions $A_2$ is smaller than the thickness of the center region $A_1$, so that the solder tends to wet on each of the end regions $A_2$. Therefore, the multilayered capacitor 1 ensures the bonding strength by the solder between the end regions $A_2$ and the electronic device 20. Consequently, the multilayered capacitor 1 suppresses wetting of the solder in the center region A₁ and ensures the bonding strength by the solder in each of the end regions A₂.

In the multilayered capacitor 1, since the ratio [W2/W] is greater than or equal to 0.2, the length in the longitudinal direction D1 of the region where the depression 6 is formed in the conductor 5b is not too small. Therefore, the multilayered capacitor 1 reliably suppresses wetting of the solder. Since the ratio [W2/W] is less than or equal to than 0.4, the length in the longitudinal direction D1 of the region where the depression 6 is formed in the conductor 5b is not too large. Therefore, the multilayered capacitor 1 reliably achieves wetting of the solder and further ensures the bonding strength by the solder.

In the multilayered capacitor 1, since the ratio [T2/T] is greater than or equal to 0.2, the length in the height direction D3 of the region where the depression 6 is formed in the conductor 5b is not too small. Therefore, the multilayered capacitor 1 reliably suppresses wetting of the solder. Since the ratio [T2/T] is less than or equal to 0.3, the length in the height direction D3 of the region where the depression 6 is formed in the conductor 5b is not too large. Therefore, the multilayered capacitor 1 reliably achieves wetting of the solder and further ensures the bonding strength by the solder.

Examples and comparative examples which are described later indicate that the present embodiment suppresses wetting of the solder. The present invention is not limited to the following Examples. Multilayered capacitors of Examples 1 to 5 have the same configuration as the multilayered capacitor 1 described above.

Table 1 illustrates the results of measuring the thicknesses M1 to M4 of the conductors 5b at positions P1 to P4 of the multilayered capacitors of Examples 1 to 5 and Comparative Example 1. Positions P1 and P3 are both located on the cross-section along the line X₁. Position P1 is located in the end region A₂. Position P3 is located in the center region A₁. Positions P2 and P4 are both located on the cross-section along the line X₂. Position P4 is located in the end region A₂. Position P2 is located in the center region A₁.

TABLE 1

| | | Position | | | |
|---|---|---|---|---|---|
| | | P1 | P2 | P3 | P4 |
| Total Thickness of Terminal Electrode [μm] | Example 1 | 25.6 | 24.4 | 21.7 | 20.1 |
| | Example 2 | 23.8 | 25.0 | 22.2 | 18.0 |
| | Example 3 | 23.5 | 24.9 | 22.3 | 20.6 |
| | Example 4 | 21.8 | 24.8 | 21.6 | 19.0 |
| | Example 5 | 22.3 | 25.1 | 22.0 | 19.7 |
| | Comparative Example 1 | 23.5 | 24.5 | 21.5 | 19.8 |

As illustrated in Table 1, in Examples 1 to 5 and Comparative Example 1, the respective thicknesses M1 and M2 at the positions P1 and P2 are larger than the thickness M3 at position P3. The thickness M4 at position P4 is smaller than the thickness M3 at position P3. The thickness M2 at position P2 is larger than the thickness M4 at position P4. Therefore, in Examples 1 to 5 and Comparative Example 1, the thickness M2 of the center region A₁ is larger than the thickness M4 of the end region A₂ in the cross-section along the line X₂.

Table 2 illustrates the results of measuring the lengths W1, W2, W, T1, T2, and T of the multilayered capacitors of Examples 1 to 5 and Comparative Example 1. In Table 2, the length W1 is the above-described length W1₁ or the length W1₂, and T1 is the length T1₁ or T1₂ described above. In Examples 1 to 5, the length W2 is larger than the length T2.

In Comparative Example 1, the length W2 is smaller than the length T2. The multilayered capacitors of Examples 1 to 5 and Comparative Example 1 were solder-mounted on the substrate, and the wetting of the solder was visually confirmed. As a result of visual confirmation, in Comparative Example 1, the solder reached the conductor 5a located on the other principle surface 2a. In Examples 1 to 5, the solder did not reach the conductor 5a located on the other principle surface 2a. Thus, the wetting of the solder was suppressed in Examples 1 to 5. The other principle surface 2a opposes the one principle surface 2a arranged to constitute the mounting surface.

TABLE 2

| | | Position | | | |
|---|---|---|---|---|---|
| | | P1 | P2 | P3 | P4 |
| Total Thickness of Terminal Electrode [μm] | Example 1 | 25.6 | 24.4 | 21.7 | 20.1 |
| | Example 2 | 23.8 | 25.0 | 22.2 | 18.0 |
| | Example 3 | 23.5 | 24.9 | 22.3 | 20.6 |
| | Example 4 | 21.8 | 24.8 | 21.6 | 19.0 |
| | Example 5 | 22.3 | 25.1 | 22.0 | 19.7 |
| | Comparative Example 1 | 23.5 | 24.5 | 21.5 | 19.8 |

The ratio [W2/W] and the ratio [T2/T] were calculated based on the results indicated in Table 2. In Examples 1 to 5, the ratio [W2/W] was from 0.2 to 0.4, and the ratio [T2/T] was from 0.2 to 0.3.

Although the embodiments and modifications of the present invention have been described above, the present invention is not necessarily limited to the embodiments and modifications, and the embodiment can be variously changed without departing from the scope of the invention.

In the above-described embodiment, each of the terminal electrodes 5 includes the conductor 5a on each of the principle surfaces 2a. However, each of the terminal electrodes 5 may include the conductor 5a only on one principle surface 2a arranged to constitute a mounting surface.

In the present embodiment, the depression 6 is formed at the approximate center of the conductor 5b when viewed from the width direction D2, but the depression 6 may be located at a position deviated from the approximate center of the conductor 5b when viewed from the width direction D2. The lengths T1₁ and T1₂ may not be equivalent to each other. The lengths W1₁ and W1₂ may not be equivalent to each other.

In the cross-section along the line X₂, the thickness of the center region A₁ and the thickness of the end region A₂ may be equivalent. In the cross-section along the line X₂, the thickness of the end region A₂ may be larger than the thickness of the center region A₁. However, as described above, the configuration in which the thickness of the center region A₁ is larger than the thickness of the end region A₂ in the cross-section along the line X₂ ensures the bonding strength by soldering in the end regions A₂, and suppresses the wetting of the solder in the center region A₁.

The ratio [W2/W] may be smaller than 0.2 or larger than 0.4. However, as described above, the configuration in which the ratio [W2/W] is from 0.2 to 0.4 reliably achieves wetting of the solder and further ensures the bonding strength by soldering.

The ratio [T2/T] may be smaller than 0.2 or larger than 0.3. However, the configuration in which the ratio [T2/T] is from 0.2 to 0.3 reliably achieves wetting of the solder and further ensures the bonding strength by soldering.

The electronic component of the present embodiment is a multilayer capacitor 1. Applicable electronic components are not limited to multilayer capacitors. Examples of the applicable electronic components include, but not limited to, multilayer electronic components such as a multilayer inductor, a multilayer varistor, a multilayer piezoelectric actuator, a multilayer thermistor, or a multilayer electronic component, and electronic components other than the multilayer electronic components.

What is claimed is:

1. An electronic component, comprising:
an element body of a rectangular parallelepiped shape, having a length in a width direction larger than a length in a height direction and having a length in a longitudinal direction larger than the length in the width direction; and
a pair of terminal electrodes disposed at both ends of the element body in the width direction and extending in the longitudinal direction, wherein
the element body includes a pair of principal surfaces opposing each other in the height direction, a pair of end surfaces opposing each other in the longitudinal direction, and a pair of side surfaces opposing each other in the width direction,
each of the terminal electrodes includes a conductor disposed on one of the pair of side surfaces,
the conductor includes:
a depression having a length in the longitudinal direction larger than a length in the height direction;
a first end region located closer to one end surface of the pair of end surfaces in the longitudinal direction;
a second end region located closer to another end surface of the pair of end surfaces in the longitudinal direction; and
a center region located between the first end region and the second end region in the longitudinal direction; and
a thickness of the center region is larger than a thickness of each of the first and second end regions in a cross-section of the conductor taken along a plane that is parallel to one of the pair of principal surfaces and is located closer to the one of the pair of principal surfaces than the depression in the height direction.

2. The electronic component according to claim 1, wherein
the depression is formed at an approximate center of the conductor when viewed from the width direction.

3. The electronic component according to claim 1, wherein
a ratio of the length of the depression in the longitudinal direction to a length of the conductor in the longitudinal direction is from 0.2 to 0.4.

4. An electronic component, comprising:
an element body of a rectangular parallelepiped shape, having a length in a width direction larger than a length in a height direction and having a length in a longitudinal direction larger than the length in the width direction; and
a pair of terminal electrodes disposed at both ends of the element body in the width direction and extending in the longitudinal direction, wherein:
the element body includes a pair of principal surfaces opposing each other in the height direction, a pair of end surfaces opposing each other in the longitudinal direction, and a pair of side surfaces opposing each other in the width direction;
each of the terminal electrodes includes a conductor disposed on one of the pair of side surfaces;
the conductor includes a depression having a length in the longitudinal direction larger than a length in the height direction; and
a ratio of the length of the depression in the longitudinal direction to a length of the conductor in the longitudinal direction is from 0.2 to 0.4.

5. The electronic component according to claim 4, wherein
the depression is formed at an approximate center of the conductor when viewed from the width direction.

* * * * *